US011157843B1

(12) United States Patent
Cairns et al.

(10) Patent No.: US 11,157,843 B1
(45) Date of Patent: Oct. 26, 2021

(54) PULL-BASED ROUTING FOR SERVICE SESSIONS

(71) Applicant: United Services Automobile Association (USAA), San Antonio, TX (US)

(72) Inventors: Michael Justin Cairns, Helotes, TX (US); Michael Joseph Gaeta, San Antonio, TX (US); Kevin K. Fiedler, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 805 days.

(21) Appl. No.: 15/169,121

(22) Filed: May 31, 2016

(51) Int. Cl.
*G06Q 10/06* (2012.01)
*G10L 15/26* (2006.01)
*G06F 3/0482* (2013.01)
*G06F 3/0484* (2013.01)
*G10L 15/08* (2006.01)

(52) U.S. Cl.
CPC ... *G06Q 10/063112* (2013.01); *G06F 3/0482* (2013.01); *G06F 3/04842* (2013.01); *G06Q 10/06316* (2013.01); *G10L 15/26* (2013.01); *G10L 2015/088* (2013.01)

(58) Field of Classification Search
CPC ...... G06Q 10/06; G06Q 30/016; G06Q 50/12; G06Q 50/14; G06Q 10/06393; G06Q 10/06395; G06Q 10/1097; H04M 99/00; H04M 2242/10; H04M 2242/16
See application file for complete search history.

(56) References Cited

U.S. PATENT DOCUMENTS

| | | | | |
|---|---|---|---|---|
| 5,825,869 A | * | 10/1998 | Brooks | H04M 3/51 379/265.12 |
| 6,173,052 B1 | * | 1/2001 | Brady | H04M 3/42323 379/265.01 |
| 6,381,640 B1 | * | 4/2002 | Beck | G06F 17/30017 707/E17.009 |
| 8,767,948 B1 | * | 7/2014 | Riahi | G06N 99/005 379/266.08 |

(Continued)

OTHER PUBLICATIONS

"Methods and Systems for Distinguishing Callers and Initiating or Scheduling Calls", ip.com Disclosure IPCOM000225822D, Mar. 7, 2013 (Year: 2013).*

*Primary Examiner* — Rutao Wu
*Assistant Examiner* — Sarjit S Bains
(74) *Attorney, Agent, or Firm* — Fish & Richardson P.C.

(57) ABSTRACT

Techniques are described for routing service requests in a service environment. Received requests received may be analyzed to determine characteristics of each request, including a category of the request, a difficulty of the request, and the individual who submitted the request. A list of pending requests may be presented in a user interface (UI) according to a hierarchical set of filters. A service representative (SR) may select a pending request to handle and, in response, a service session may be initiated between the SR and the individual who submitted the request. Each request may be assigned a point value according to a set of configurable rules, e.g., based on the difficulty of the request, the amount of time it has been pending in the queue of requests, and/or other characteristics. The point value of the request may be added to a score of the SR who handles the request.

16 Claims, 5 Drawing Sheets

(56) References Cited

U.S. PATENT DOCUMENTS

| | | | |
|---|---|---|---|
| 2004/0141508 A1* | 7/2004 | Schoeneberger | H04L 41/5064 370/401 |
| 2006/0221941 A1* | 10/2006 | Kishinsky | H04M 3/523 370/352 |
| 2007/0255611 A1* | 11/2007 | Mezo | G06Q 30/02 235/381 |
| 2010/0086120 A1* | 4/2010 | Brussat | H04M 3/5233 379/265.12 |
| 2010/0246800 A1* | 9/2010 | Geppert | H04L 65/403 379/265.09 |
| 2012/0300920 A1* | 11/2012 | Fagundes | H04M 3/523 379/265.05 |
| 2013/0142322 A1* | 6/2013 | Grasso | G06Q 10/06398 379/265.08 |
| 2014/0171034 A1* | 6/2014 | Aleksin | G06Q 30/016 455/414.1 |
| 2015/0023490 A1* | 1/2015 | Jay | H04M 3/5233 379/265.12 |
| 2015/0213512 A1* | 7/2015 | Spievak | G06Q 30/0275 705/14.71 |
| 2016/0006871 A1* | 1/2016 | O'Connor | H04M 3/5175 379/265.05 |
| 2016/0021250 A1* | 1/2016 | Kumar | H04M 3/5232 379/88.01 |
| 2016/0034260 A1* | 2/2016 | Ristock | G06F 8/34 717/109 |
| 2016/0065738 A1* | 3/2016 | Schwartz | H04M 3/4217 379/265.03 |
| 2016/0119477 A1* | 4/2016 | Sharpe | H04W 4/21 379/265.09 |
| 2016/0212266 A1* | 7/2016 | Soundar | H04M 3/5235 |

* cited by examiner

PULL-BASED ROUTING FOR SERVICE SESSIONS

BACKGROUND

An organization may use any number of computing systems, communications networks, data storage devices, or other types of systems to provide services to individuals. An organization may also employ service representatives that use the various systems to assist individuals in service sessions that are conducted over the telephone, in a video conference, through text chat sessions, or over other communication channels. An organization may seek to optimize the manner in which incoming service requests are routed to service representatives to ensure optimal usage of computing resources and also to provide an appropriate level of responsiveness to the individuals.

SUMMARY

Implementations of the present disclosure are generally directed to routing requests in a service environment. More specifically, implementations are directed to pull-based routing of requests in a service environment, in which the routing employs rule sets to determine point values for various requests and hierarchical filters to present pending requests in a user interface.

In general, innovative aspects of the subject matter described in this specification can be embodied in methods that include actions of: determining at least one characteristic of each of a plurality of service requests received in a service environment; presenting a list of the plurality of service requests in a user interface (UI), the list including an indication of the at least one characteristic of each of the plurality of service requests; detecting a selection of the service request from the list, the selection made through the UI by a service representative (SR); and in response to the selection of the service request, initiating a service session between the SR and an individual associated with the service request.

Implementations can optionally include one or more of the following features: the at least one characteristic of the service request includes one or more of a communication channel of the service request, a category of the service request, a keyword associated with the service request, a difficulty of the service request, a wait time of the service request, an identifier of the individual associated with the service request, or a presence of the individual in a favorites list of the SR; the at least one characteristic is determined based at least partly on a natural language analysis of each of the plurality of service requests; the at least one characteristic is determined based at least partly on an indication made through a request interface by an individual associated with each of the plurality of service requests; the actions further include determining a point value for each of the plurality of service requests; the actions further include presenting the point value for each of the plurality of service requests in the UI; the actions further include in response to the selection of the service request, updating at least one score for the SR based on the point value of the service request; the point value for each of the plurality of service requests is based at least partly on a difficulty and a wait time of each of the plurality of service requests; the point value for each of the plurality of service requests is determined by applying a set of rules; the actions further include presenting the set of rules in the UI; the actions further include providing at least one control in the UI, the at least one control being employable by an authorized user to modify the set of rules; the service session is initiated as one or more of a voice chat session, a video chat session, a text chat session, or a document sharing session; the list of the plurality of service requests that is presented in the UI is filtered based on one or more of a communication channel or a category associated with the SR; and/or the list of the plurality of service requests that is presented in the UI is filtered based on a hierarchical set of filters.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. In traditional service environments, such as call centers, call routing may involve a number of administrators who determine which service representative is to receive and handle a particular call from a customer. Although traditional service environments may include some automation to route service requests, such automatic routing typically requires programmers to consider all possible scenarios and create routing logic and/or write code to handle the various scenarios, leading to the expenditure of a large amount of programming time and computing resources. Moreover, traditional call routing systems (either automatic or manual) may be prone to errors and may not adequately account for all possible scenarios in which individuals are requesting service to address a problem, issue, or question. Implementations address these problems by decentralizing the routing process and providing a user interface that enables service representatives to indicate which service requests they will handle. Accordingly, implementations avoid the coding that is needed in traditional systems to implement routing logic, and implementations also do not consume as much processing power, memory, and/or other computing resources that traditional systems consume to execute routing logic to make routing decisions. Implementations replace the traditional push-based systems, in which requests are pushed to service representatives without service representative input, with a pull-based system in which each service representative decides which requests to handle based on their preference, expertise, fatigue level, and/or other considerations. Accordingly, implementations substantially reduce or eliminate erroneous routing decisions that may be made in traditional systems.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and

DETAILED DESCRIPTION

Implementations of the present disclosure are directed to systems, devices, methods, and computer-readable media for routing service requests in a service environment such as a call center, online service portal, and so forth. Service requests received in a service environment are analyzed to determine characteristics of each request, including a category of the request, a difficulty of the request, and the customer or other individual who submitted the request. A list of currently pending requests is presented in a user interface (UI) that is accessible by one or more service representatives (SRs) in the call center or other service environment. A SR may view the currently pending requests and decide which request to handle, based on the category, difficulty, and/or other characteristics of the request. In response to a SR accepting the request (e.g., agreeing to handle the request) through the UI, a service session may be initiated between the SR and the individual who submitted the request. In some implementations, each request is assigned a point value based on the difficulty of the request, the amount of time it has been pending in the queue of requests, and/or other characteristics. The point value of the request may be added to a score of the SR who handles the request, to provide an incentive for SRs to take on more difficult and/or longer pending requests.

In traditional service environments, such as call centers, call routing may involve a number of administrators who determine which SR is to receive and handle a particular call from a customer. Although some traditional call centers may automatically route service requests, such routing typically requires programmers of the system to consider all possible scenarios and create routing logic to handle the various scenarios. Accordingly, traditional call routing systems (either automatic or manual) may be prone to errors and may not adequately account for all possible scenarios in which individuals are requesting service to address a problem, issue, or question. Implementations address these problems by at least partly decentralizing the routing process and enabling SRs to themselves decide which service requests to handle. Accordingly, implementations replace the traditional push-based systems (in which requests are pushed to SRs without SR input) with a pull-based system in which the SR decides which requests to handle based on their preference, expertise, fatigue level, and/or other considerations.

As described herein, a service session may include any number of communications between an individual (e.g., a customer) and a SR. In some examples, a service request (e.g., question, complaint, inquiry, etc.) may be submitted by an individual via a telephone call, a real-time chat session, text message, email, or other communications channel. The service request may be routed to a SR, and the SR may respond to the initial request with a voice response, text response, or otherwise. In some instances, the SR may respond to the service request through the same communication channel as that used by the individual to submit the service request. Accordingly, the service session may be conducted through the communication channel initially used by the individual. For example, the individual may call into a service center using their telephone, a voice over internet protocol (VOIP) application, or otherwise. The call may be routed to a particular SR, who may then conduct the service session with the individual using the telephone connection, VOIP connection, or otherwise. In other examples, the individual may contact a service center through video chat, instant messaging (IM), social media messaging, email, or through other communication channels, and the service session may be conducted through the initially selected communication channel. During the service session, the individual may submit any number of communications, and the SR may respond in turn. Accordingly, a service session may constitute a conversation between the individual and the SR that includes any number of communications sent between the parties over any period of time. A service session may be conducted in real time as a conversation between the SR and the individual, such a telephone conversation, IM chat session, video chat session, VOIP conversation, and so forth. A service session may also be conducted through the exchange of communications that are not in real time, such as an exchange of email messages. A service session may also include the exchange of screen shots, images, audio files, video files, and/or other types of files or any other appropriate type of documents to facilitate the conversation between the SR and the individual.

Figure 1:
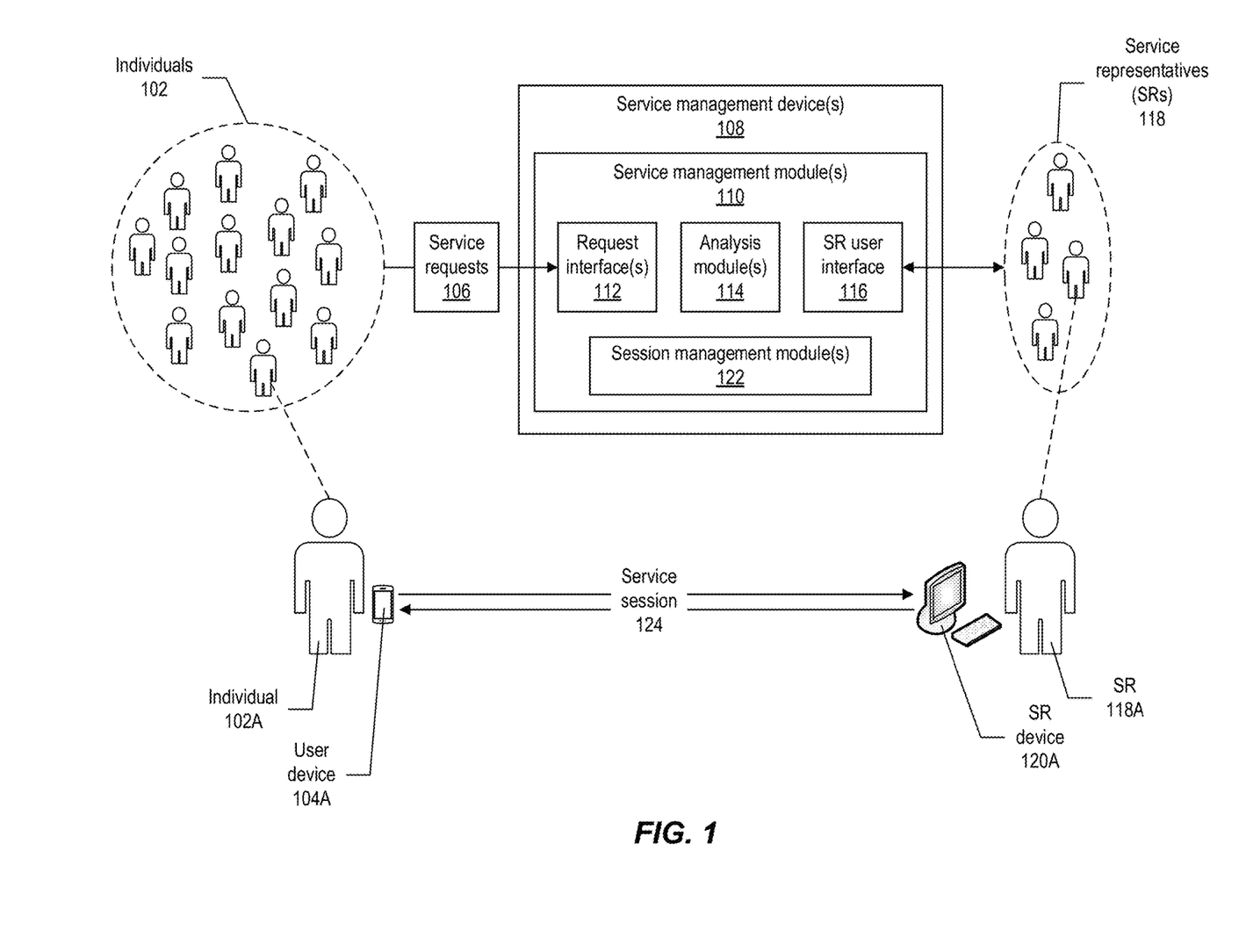
FIG. 1 depicts an example system for routing service requests in a service environment, according to implementations of the present disclosure.

FIG. 1 depicts an example system for routing service requests in a service environment, according to implementations of the present disclosure. As shown in the example of FIG. 1, a plurality of individuals 102 may each employ a user device 104 to generate a service request 106. The service requests may be communicated, over one or more networks, to one or more service management modules 110 executing on one or more service management devices 108 in a service environment.

The user device 104 may include any suitable type of computing device, such as a desktop computer, laptop computer, tablet computer, smartphone, wearable computer, and so forth. The computing device may be a portable computing device (e.g., smartphone, wearable computer) or a non-portable (or less readily portable) computing device. In some instances where the individual 102 contacts the service environment through a telephone call, the user device 104 may be a telephone that may or may not be a computing device. The service management device(s) 108 may include any suitable number and type of computing devices, such as server computers, distributed computing devices (e.g., cloud servers), network servers, network gateways, front end servers, back end servers, and so forth.

The service request 106 from an individual 102 may be received by one or more request interfaces 112 provided by the service management device(s) 108. As described above, implementations support various communication channels. The submission of a service request 106, and/or the particular request interface 112 that receives the service request 106, may vary based on the communication channel used by the individual 102 to send the service request 106. For example, an individual 102 may use a voice telephony network or data network to make a telephone and/or VOIP call to a call center. In such examples, the request interface 112 may enable the individual 102 may navigate through a sequence of audio menus and/or communicate with an interactive voice response (IVR) system to generate a service request 106 based on the individual's speech inputs and/or inputs through a telephone numeric keypad. As another example, an individual 102 may access a request interface 112 through an online application and/or web application to submit a service request 106 for a real time text chat session, video chat session, and/or audio chat session. In some instances, the individual 102 may send a service request 106 in the form of an email to an address associated with the service environment, and the request interface 112 may be configured to handle email communications arranged according to a version of internet message access protocol (IMAP), simple mail transfer protocol (SMTP), or some other protocol.

The request interface 112 may forward a service request 106 to one or more analysis modules 114 executing on the service management device(s) 108. The analysis module(s) 114 may analyze the service request 106 to determine one or more characteristics of the service request 106. In some implementations, the analysis module(s) 114 may employ natural language processing and/or semantic analysis to determine the characteristic(s) of a particular service request 106. For example, the analysis module(s) 114 may detect particular words and/or phrases in the service request 106 that indicate a category and/or type of the service request 106 (e.g., "I need help opening a new account" or "I need to file a homeowner's insurance claim"). In some implementations, the analysis module(s) 114 may employ machine learning (ML) and/or artificial intelligence (AI) techniques in addition to or instead of natural language processing, to determine characteristic(s) of a service request 106. For example, the analysis module(s) 114 may employ a classifier that has been trained to classify various service requests 106 into various types and/or categories such as requests related to banking, insurance, investments, and so forth, based on patterns of language used in the service requests 106. Accordingly, implementations may employ ML and/or AI techniques to determine an intent of the individual 102. In some implementations where the service request(s) 106 are submitted as speech input, the analysis module(s) 114 may employ one or more speech-to-text (STT) techniques to generate text data based on the speech input, e.g., transcribe the speech input. Subsequent analysis may then be performed on the generated text data.

In some implementations, the characteristic(s) and/or intent of a service request 106 may be indicated, at least in part, by input(s) made by the individual 102 to the request interface 112. For example, if the individual 102 has called into a call center using their telephone, they may be asked to navigate an IVR system that collects information regarding the reason they are calling (e.g., "if you are calling about auto insurance, press 1, if you are calling about banking services, press 2 . . . "). The IVR system may be configured to gather more specific information as the individual 102 navigates deeper into a hierarchy of menus provided by the IVR system. For example, a first menu may ask the individual 102 whether they are calling regarding insurance (e.g., "press 1"), banking (e.g., "press 2"), investments (e.g., "press 3"), and so forth. Following the individual's indication of insurance, a second menu may ask the individual 102 whether they are call regarding auto insurance, homeowner's insurance, and so forth. Following the individual's indication of auto insurance, a third menu may ask the individual 102 whether they are calling to file a claim, make a payment, add or remove a vehicle from their policy, and so forth. In examples where the request interface 112 is a graphical user interface (GUI) provided by a web application or other application, the individual 102 may check boxes, select menu items, enter text, click buttons, or otherwise interact with the GUI to indicate characteristic(s) of the service request 106.

In some implementations, the analysis module(s) 114 may generate metadata that indicates the characteristic(s) of a service request 106, and the metadata may be stored with and/or communicated with the service request 106 as it is further processed in the service management module(s) 110. Characteristic(s) of a service request 106 may include, but are not limited to, one or more of the following:

A communication channel of the service request 106, such as whether the service request 106 was received as a telephone call, VOIP call, video chat request, IM chat request, email, text message (e.g., SMS and/or MMS message), a message submitted through a messaging system of a social network, and so forth;

A category and/or type of the service request 106, such as a particular product or service that the individual 102 is inquiring about (e.g., banking, investments, insurance, and so forth) to any suitable degree of specificity (e.g., auto insurance vs. homeowner's insurance, checking account vs. savings account, etc.);

One or more keywords included in or otherwise associated with the service request 106, such as "market", "travel", "stocks", "account", "tips", and so forth;

A difficulty of the service request 106, indicating a complexity of the request and/or degree of specialized knowledge required to service the request, and/or a difficulty of the individual 102 submitting the request as described further below;

A wait time of the service request 106, such as how long the service request 106 has been in a queue waiting to be handled by a SR (e.g., how long the individual has been waiting to be helped); or An identifier of the individual 102 who submitted or is otherwise associated with the service request 106, such as the individual's name, identification number (e.g., account number), and so forth.

In some implementations, additional characteristic(s) may be determined for a service request 106. For example, the system may retrieve additional information regarding the individual 102 who submitted or is otherwise associated with the request, such as demographic details (e.g., age, gender), address and/or location information, the various accounts managed for the individual 102, the type(s) of computing device(s) used by the individual 102, the amount of time that the individual 102 has been a customer and/or user of the service, and so forth. Characteristic(s) may also include information regarding previous interactions with the individual 102 such as previous issues addressed or problems solved (or not solved) for the individual 102, whether the individual has a difficult personality to work with (e.g., impatient, easily angered, etc.), and/or other information that may be useful to a SR working with the individual 102. In some implementations, a SR may be able to curate a list of favorite (or non-favorite) individual(s) 102, and the characteristic(s) may include information regarding whether the individual 102 is on such list(s) for one or more SRs.

In some implementations, the service management device(s) 108 may provide a SR UI 116 that lists the service requests 106 currently pending (e.g., waiting to be handled by a SR). The SR UI 116 may list the service requests 106 with the various characteristic(s) of each service request 106, such as the individual 102 who submitted the request, the communication channel used to submit the request, the category and/or type of request, the wait time of the request, and so forth. One or more SRs 118 may each employ a SR device 120 to access the SR UI 116 and view the currently pending service requests 106. The SR UI 116 may enable a SR 118 to select a service request 106 and indicate that they will handle the selected request. The SR UI 116 is described further with reference to FIGS. 2A and 2B. The SR device 120 may be any appropriate type of computing device, such as a desktop computer, laptop computer, and so forth.

In response to a particular SR 118A indicating that they will handle a service request 106 of a particular individual 102A, a service session 124 may be initiated to enable communications between the SR 118A and the individual 102A over the communication channel associated with the service request 106. The service session 124 may continue until one or both parties terminate the session, and/or until the individual's problem, question, or issue is resolved. In some implementations, the service management device(s) 108 may execute one or more session management modules 122 that initiate, terminate, and/or otherwise manage service sessions 124 between SRs 118 and individuals 102.

In some implementations, the request interface 112 and/or SR UI 116 may be respectively employed by the individual 102 and the SR 118 to communicate during the service session 124. For example, in instances where the service session 124 is conducted as an IM chat, video chat, and/or audio chat, the chat interfaces may be presented within the request interface 112 and/or SR UI 116. In instances where the service session 124 is conducted over a telephone network, the telephone conversation may take place independently of the interface(s) after the conversation is initiated. In such instances, the interface(s) may still be employed by the SR 118 and/or individual 102 to share screen shots, files, documents, or other information to facilitate the resolution of the problem, question, or issue.

In some implementations, the service management device(s) 108 and/or SR device 120 may include functionality to record a service session 124. The recording may include an audio recording, video recording, a transcript of audio and/or video data, a transcript of text messages sent during the service session 124, and/or any other capture of information communicated between the SR 118 and the individual 102 during the service session 124. The recording may be stored on the service management device(s) 108, SR device 120, or elsewhere, and may be replayed or otherwise accessed by the SR 118. For example, in instances where the text transcript of a session is not clear, the SR 118 may refer to the audio recording for clarification.

Figure 2A:
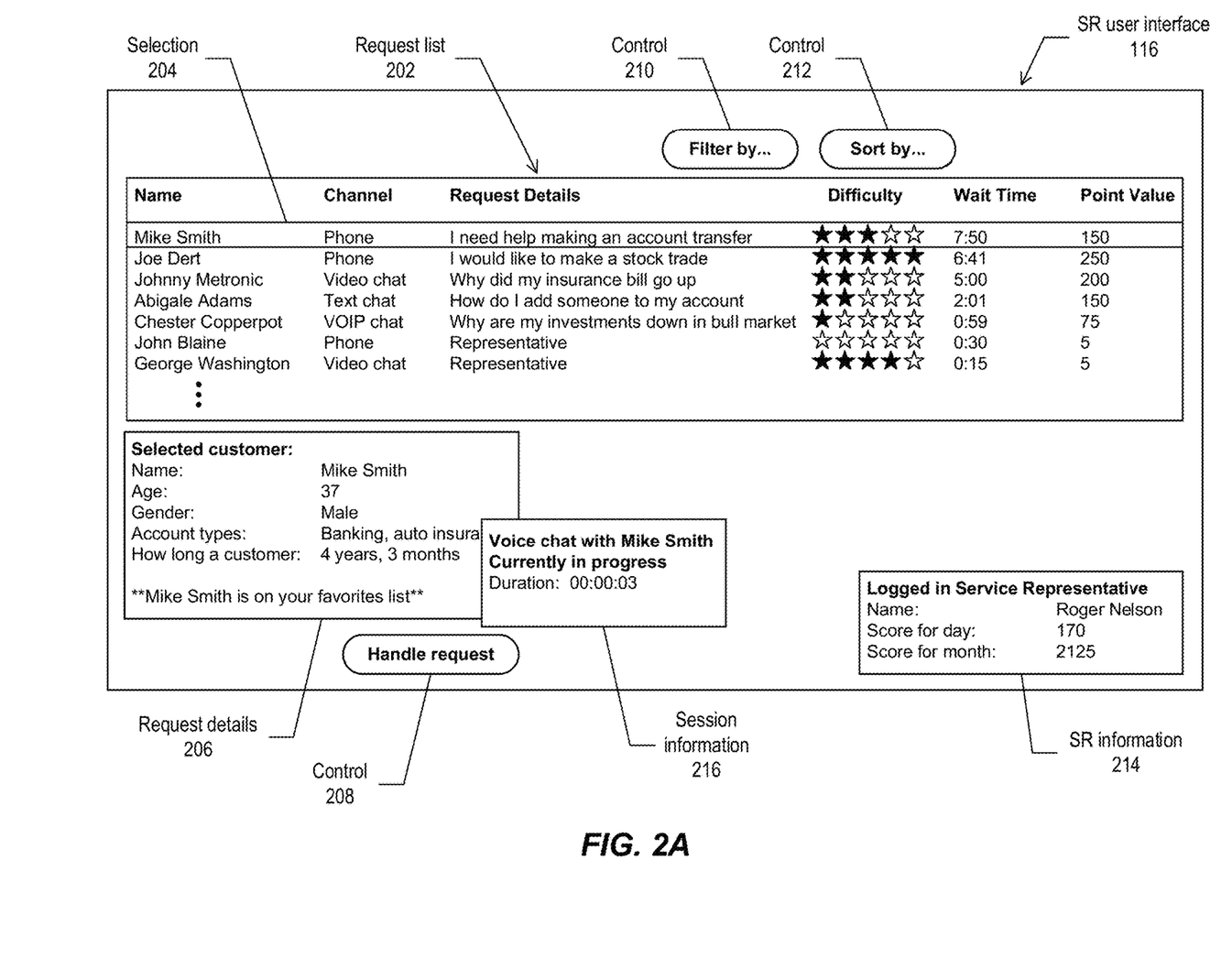
FIGS. 2A and 2B depict examples of a service representative user interface which may be employed for routing service requests in a service environment, according to implementations of the present disclosure.

FIG. 2A depicts an example of a SR UI 116 which may be employed for routing service requests 106 in a service environment, according to implementations of the present disclosure. As shown in the example of FIG. 2A, the SR UI 116 may include a request list 202. The request list 202 may present a list of the current pending service requests 106, e.g., request(s) that are not yet being handled by a SR 118. For each service request 106, the list may present: a name of the individual 102; the communication channel being used (e.g., phone call, video chat, text or IM chat, VOTP call, etc.); the details of the request itself or at least as much as may be determined based on analysis of the request; and the wait time of the request (e.g., how long the request has been queued). The details of the request may include at least a portion of the text and/or transcript of speech input provided by the individual 102 (e.g., "why did my insurance bill go up"). In some instances, the request details may include a list of keyword(s) determined for the request, such as "banking, account transfer." In some instances, the request details may indicate that the individual 102 has requested to speak with a SR 118 (e.g., "Representative" or "Operator, please") without providing other information regarding the intent of the request.

In some implementations, the request list 202 may indicate a difficulty of each request. In some implementations, the difficulty may be based on the complexity of the request, an estimate of the time that may be needed to resolve the request, and/or specialized knowledge required to handle the request. For example, a more common request (e.g., "file an insurance claim") may be rated as less difficult than a less common request. In some implementations, the difficulty of a request may be based at least partly on characteristic(s) of the individual 102 who submitted the request. For example, a request may be rated at a higher difficulty if the individual 102 has, during previous service sessions, shown a tendency to be rude, angry, enraged, and so forth. In some implementations, the difficulty may be based on both the characteristic(s) of the request (e.g., complexity, subject matter, specialized knowledge needed) and the characteristic(s) of the individual 102.

In some implementations, a point value may be determined for each of the service request(s) 106 in the request list 202. The point value may be based on wait time and/or difficulty of the request. For example, a request that has been pending longer in the queue may be assigned a higher point value than a request that has been pending for a shorter time. As another example, a request with a higher difficulty may be assigned a higher point value than a request with a lower difficulty. In some implementations, the point value may be a mathematical combination of the difficulty, wait time, and/or other factors. The point value may vary linearly with respect to one or both of the difficulty or the wait time, or may vary according to some other mathematical relationship. For example, to provide a greater incentive for SRs 118 to handle a request that has been pending longer, the point value may increase faster than linearly as the wait time increases, e.g., as an exponential function, a polynomial function, or other.

The SR UI 116 may also present other characteristic(s) for one or more service requests 106. For example, the request list 202 may present keyword(s) associated with each request, a category or type of each request, a language spoken by the individual 102 for each request, and so forth. The SR UI 116 may present a set of characteristic(s) for each of the service request(s) 106, and the set of characteristic(s) may include any portion (e.g., key/value pair) of the metadata associated with the request. The SR UI 116 may also present metadata associated with the currently logged in SR and/or metadata associated with the individual(s) 102 associated with the request(s).

In some implementations, the SR UI 116 may present SR information 214 describing the SR 118 who is currently logged into and/or using the SR UI 116. As shown in the example of FIG. 2A, the SR information 214 may include the name of the SR 118. The SR information 214 may also include other information such as subject matter expertise of the SR 118, e.g., the types and/or categories of requests that the SR 118 is qualified and/or able to handle, based on their training and/or experience.

In some implementations, the SR information 214 may include one or more scores of the SR 118. A score may be calculated based on the point value of each of the service requests 106 handled by the SR 118. For example, if the SR 118 agrees to handle a request, and/or the SR 118 successfully resolves the request, the point value for the request may be added to the SR's score. A score may be calculated for the SR 118 over one or more time periods. For example, the system may keep a daily score and a monthly score for the SR 118 as shown in FIG. 2A. In some implementations, a SR 118 may be required to meet a particular minimum score each day, week, month, or over another time period. In some instances, the score(s) may be considered when reviewing the SR's performance to determine compensation, bonuses, special prizes, promotion, and so forth. By providing higher point values for those service request(s) 106 that are more difficulty and/or longer pending, implementations provide an incentive for SRs 118 to take on the more difficult request(s) and/or those request(s) that have been pending longer in the queue. In some implementations, the SR information 214 may include a set of keyword(s) (e.g., a word cloud) that includes terms corresponding to the various areas of expertise of the currently logged in SR 118, such as whether the SR 118 handles particular service areas (e.g., banking, insurance) and/or has experience with particular technologies (e.g., particular mobile operating systems, handing mobile app problems, etc.). In some implementations, the areas of expertise may be indicated by various icon(s) (e.g., badge(s)) presented in the SR information 214.

A SR 118 may review the request list 202 and make a selection 204 of one of the currently pending service requests 106. In response to the selection 204, the SR UI 116 may present request details 206. The request details 206 may include information regarding the individual 102 who submitted the selected request, such as the individual name, demographic characteristics, location, spoken languages, account types associated with individual, the amount of time the individual 102 may been a user (e.g., customer) of the service, notes previously entered by SR(s) 118 who helped the individual 102 in the past, information regarding previous service session(s) with the individual 102, and so forth. In some implementations, the SR 118 may curate a list of favorite and/or non-favorite individual(s) 102, based on previous interactions with such individual(s) 102. The request details 206 may indicate whether the individual 102 is on such a list for the currently logged in SR 118. The request details 206 may also include other information regarding the selected request, such as a collection of keyword(s) that have been determined for the request. In some implementations, the SR UI 116 may display a keyword cloud for the selected request, in which more important and/or more frequently used keyword(s) in the request are displayed larger than other words associated with the request.

If the SR 118 chooses to handle the service request 106 for the current selection 204, the SR 118 may click or other gesture on a control 208 included in the SR UI 116. Such an action may cause a service session 124 to be initiated between the SR 118 and the individual 102 associated with the selected request. In some implementations, the SR UI 116 may present a (e.g., pop up) window and/or dialog that displays session information 216, describing the current service session 124 between the SR 118 and the individual 102, the duration of the session so far, the communication channel being used, and/or other information.

In some implementations, the SR UI 116 may include a control 210 and/or control 212. The control 210 may enable the SR 118 to filter the request list 202 based on one or more criteria. For example, the SR 118 may use the control 210 to indicate the communication channel that the SR 118 is able to use, and the request list 202 may be filtered to only present those pending requests for the selected channel. Filtering may be performed based on one or more characteristics of the service requests 106. Filtering may also be based on characteristics of the individuals 102. For example, the SR 118 may request filtering to present only those requests from individuals who are on the SR's favorites list. As another example, the SR 118 may request filtering to present only those requests from individuals who speak a language that the SR 118 is also able to speak.

In some implementations, filtering may be performed automatically by the SR UI 116 in addition to or instead of manually requested filtering through the control 210. For example, the SR 118 may have particular characteristics regarding the language(s) they speak, the communication channel(s) they are able to use, and/or the categories of requests they are able to handle. As a particular example, a SR 118 may be able to handle requests regarding banking but not insurance. In such instances, the SR UI 116 may automatically filter the service requests 106 such that the request list 202 only includes those requests with the channel, language, and/or category that are appropriate for the currently logged in SR 118.

In some implementations, the SR UI 116 may present a list of requests to a currently logged in SR 118, and the particular list of requests to present may be determined based on a hierarchical (e.g., tiered) set of filters associated with the SR 118, the SR's group, and/or the service organization as a whole. Through use of a hierarchical set of filters, different filters may be applied with varying precedence to determine which requests are to be presented to a SR 118 in the SR UI 116. For example, a first (e.g., top level) filter may filter incoming requests for those that are telephonic, for a SR 116 who is able to handle telephone calls but not other channels. Then, a second filter may be applied to further filter the requests to select those related to banking, if the SR 116 specializes in banking-related requests. Then, a third filter may be applied to further filter the requests to select those in which the individual speaks Spanish, if the SR 116 has indicated that they would like to handle requests in Spanish. Any appropriate number of filters may be applied in any order and/or with any precedence to determine the presented list of requests.

A SR 118 may have the ability to "pull" the request that they feel best matches their skill set. Filters may be arranged into a hierarchy (e.g., tiered) with different levels and an order of precedence. In some instances, filter sets may be managed by supervisors or managers within a service organization. In some implementations, the SR 118 may create their own custom filter sets and/or their own custom hierarchy of filters to empower the SR 118 to find the best set of filters to present those requests that may optimize the SR's score and/or otherwise fit the SR's work style. In some implementations, the SR UI 116 may include functionality that enables a SR 118 to manage their own custom set of filters. The SR UI 116 may also enable a SR 118 to share their filter sets with other SR(s) and/or other user(s), to enable others to benefits from a particular filter set and thus achieve operational efficiencies. In some examples, supervisor-created or manager-created filter sets may take precedence over SR-created filter sets. In some examples, SR-created filter sets may take precedence over supervisor-created or manager-created filter sets.

Using the control 212, the SR 118 may indicate that the request list 202 is to be sorted based on one or more characteristics of the presented service requests 106. For example, the request list 202 may be sorted to list higher point value requests higher in the list than lower point value requests. As another example, the request list 202 may be sorted to list higher difficulty requests higher than less difficult requests. The control 212 may enable sorting based on one or more of the presented (or non-presented) characteristics of the service requests 206.

In some implementations, one or more sets of rules may be applied to determine the difficulty of a particular service request 106 and/or determine the point value of a particular service request 106. Such rule set(s) may be created and maintained across a service organization, and/or may be adjustable for different groups within the service organization. For example, a supervisor of a particular group may determine that wait times are too long, and may modify the rules to assign higher point values as wait times increase. In some implementations, the SR UI 116 may include one or more windows, frames, dialogs, controls, and/or other UI elements that enable an authorized SR and/or SR supervisor to update the rule set(s).

Figure 2B:
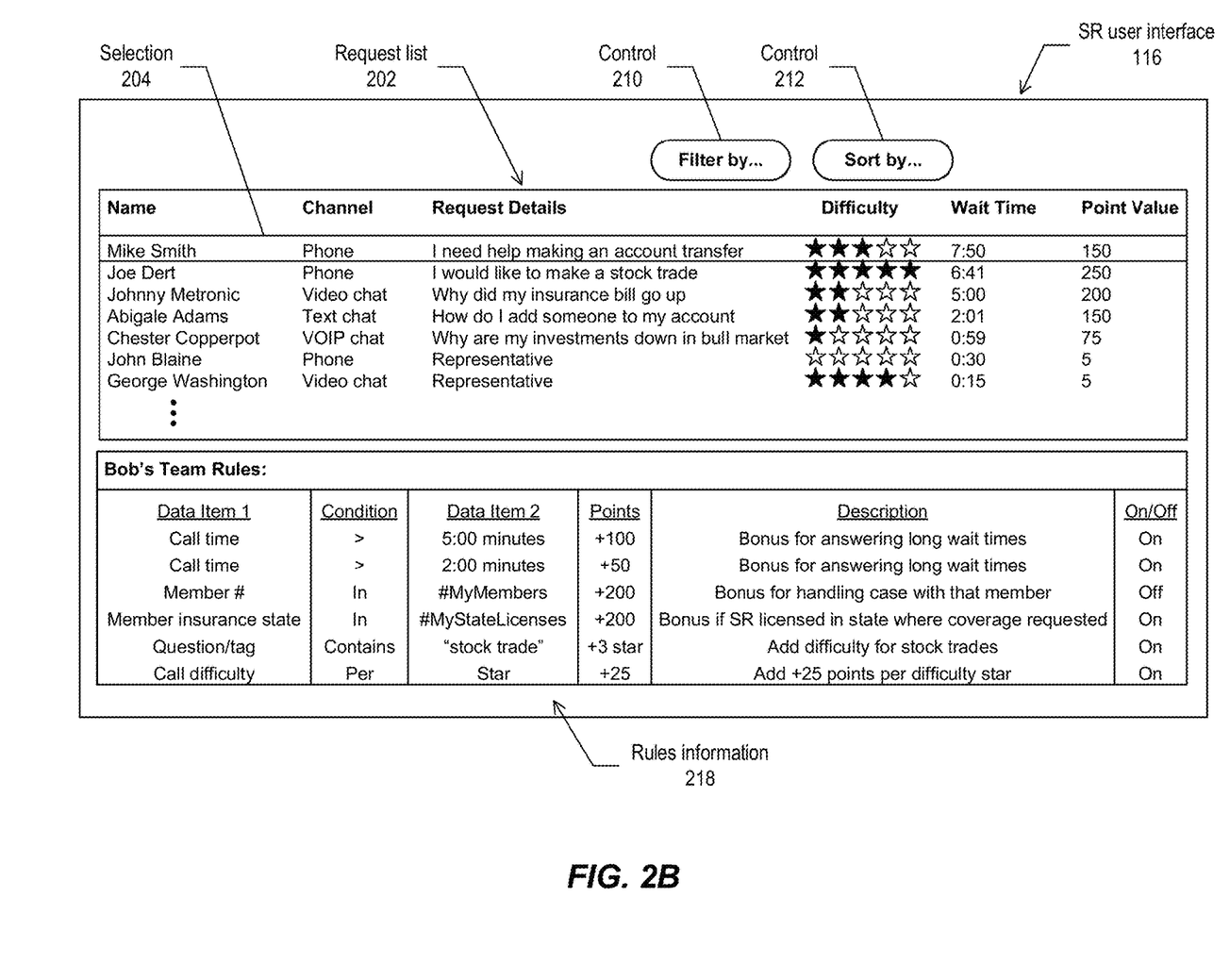

FIG. 2B depicts an example of the SR UI 116 in which the UI is presenting a set of rules in rules information 218. The rules information 218 may present a set of rules that may be applicable to a particular group (e.g., Bob's team) within a service organization. In some instances, the rules information 218 presents rules that are generally applicable within an organization, and/or rules that are applicable to the particular SR 118 currently logged into the UI.

The rule information 218 may include information for a first data item (e.g., Data Item 1), a condition, and a second data item (e.g., Data Item 2). These three elements may define a conditional statement to be applied within the rule, e.g., <Data Item 1> <Condition> <Data Item 2>. In the example of FIG. 2B, the rules information includes a first rule with a conditional statement of call time >5:00 minutes. The conditional statement may compare two or more data items using a mathematical operator such as greater than, less than, equals, included in (e.g., contains), and so forth. The conditional statement may also include other types of operators. The rules information 218 may also include information for a result to be applied (e.g., Points) if the conditional statement evaluates to true. In the first example, if call time >5:00 minutes, the number of points rewarded for taking a call is increased by 100. The rules information 218 may include a textual description of the rule (e.g., "Bonus for answering long wait times"). The rules information 218 may also include whether the rule is currently being applied (e.g., On or Off). The rules may be applied to increase, or decrease the point values for particular request characteristics. The rules may also be applied to increase the difficulty rating of requests that exhibit particular characteristics. For example, as shown in FIG. 2B, requests involving stock trades may have their difficulty increased (e.g., add three stars) given the complexity and/or difficulty of the subject matter.

In some instances, the values of the data items may be dynamically evaluated. For example, as shown in FIG. 2B, a data item that begins with a hash character or other control character may indicate that the data item is to be evaluated dynamically for each request, individual associated with the request, and/or SR. For example, a SR may receive a 200 point bonus for handling a request from an individual that is in the SR's favorites list (e.g., MyMembers). As another example, a SR may receive a 200 point bonus for handling a request for insurance coverage in a state where the SR is licensed. Dynamically evaluated rules may provide for greater flexibility in rules evaluations and/or more granular access to requests.

FIG. 2B depicts an example of rules information 218 that is presented to a SR 118, in the SR UI 116, as read-only information. In some implementations, the SR 118 may be able to view the rules information 218 in the SR UI 116 but may not be able to change the rules unless the SR 118 has permission to do so (e.g., if the SR is a manager). If the current user is a manager, supervisor, or other user with permission to update rules, the user may employ the UI to modify, add, and/or remove one or more rules. The user may also turn rules on or off through the UI. In some implementations, the UI may enable a user to share rules among their peers. For example, a manager of a first group may share their particular set of rules with a manager of another group, to enable the other manager to apply the same rules or modify the rules to suit the needs of their particular group. In some implementations, a manager, supervisor, or other authorized user may access a different UI (e.g., a management UI or supervisor UI) other than the SR UI 116 and use the different UI to manage (e.g., change, add, remove, and/or share) rule set(s) for a group and/or organization.

Figure 3:
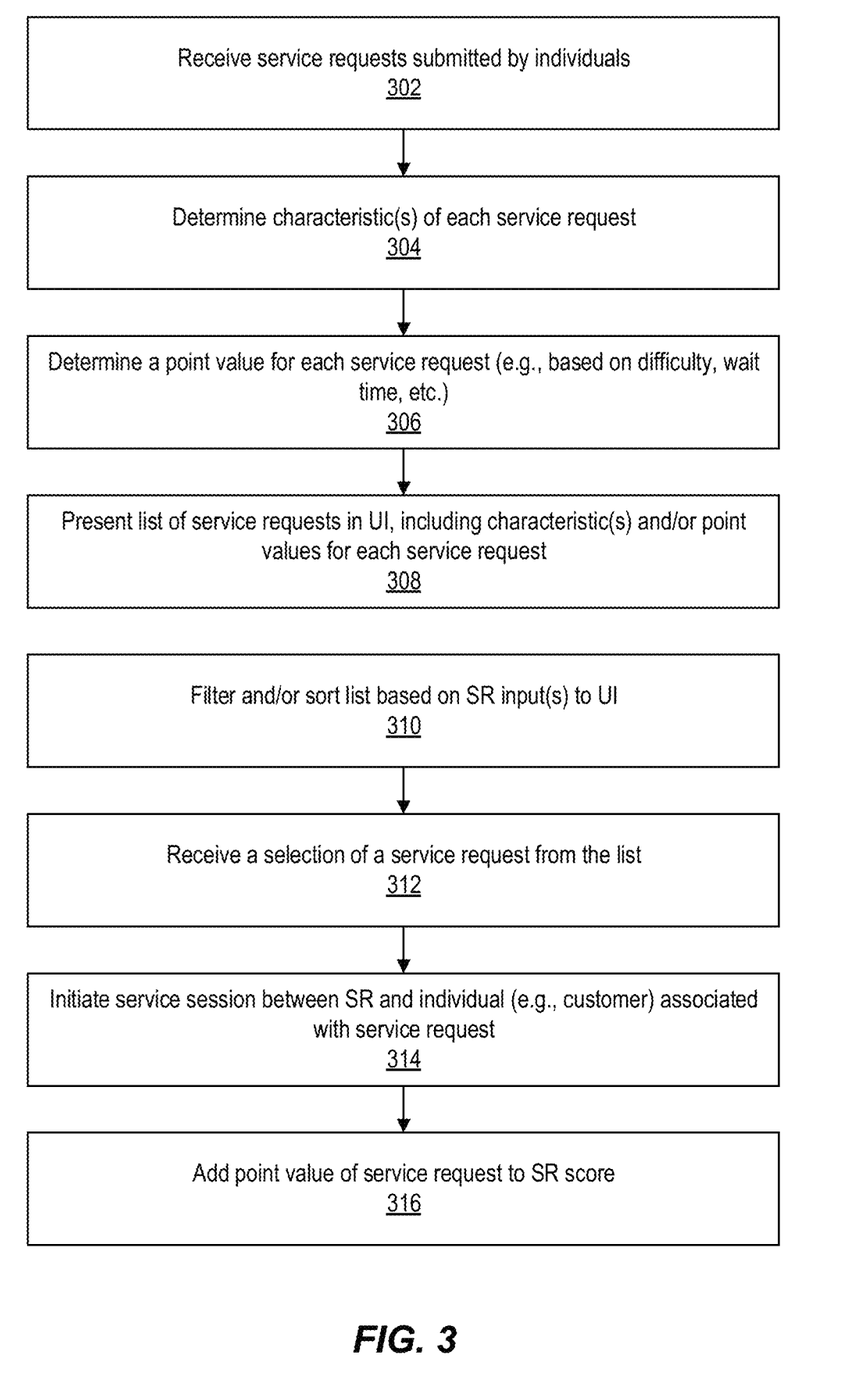
FIG. 3 depicts a flow diagram of an example process for routing service requests in a service environment, according to implementations of the present disclosure.

FIG. 3 depicts a flow diagram of an example process for routing service requests 106 in a service environment, according to implementations of the present disclosure. Operations of the process may be performed by one or more of the service management module(s) 110, the analysis module(s) 114, the session management module(s) 122, the SR UI 116, and/or other software module(s) executing on the user device 104, the service management device(s) 108, the SR device 120, or elsewhere.

Service requests 106 are received (302) at the service management device(s) 108. The service requests 106 may be submitted by individuals 102 using various communication channel(s) as described above.

Each service request 106 may be analyzed to determine (304) one or more characteristics of the service request 106. Such analysis may include natural language analysis, AI-based analysis, ML-based analysis, or other automated forms of analysis. In some instances, various inputs of the individual 102 through the request interface 112 may indicate characteristic(s) of the request, as described above.

In some implementations, a point value may be determined (306) for each service request 106. As described above, the point value may be based on the difficulty, wait time, and/or other characteristic(s) of the request.

The request list 202 of currently pending service requests 106 may be presented (308) in the SR UI 116. As described with reference to FIG. 2A, the SR UI 116 may also present one or more characteristic(s) of each service request 106. In some instances, the request list 202 may be filtered and/or sorted (310) automatically and/or based on the SR's input(s) to the SR UI 116, as described above.

A selection 204 of a particular service request 106 may be received (312). In response to the selection 204 and/or the SR's indication that they will handle the request, a service session 124 may be initiated (314) between the SR 118 and the individual 102 associated with the request. In instances where the communication channel is a telephone network, initiating a service session 124 may include routing a phone call to enable the SR 118 to speak with the individual 102. In instances where the communication channel is IM, text chat, video chat, VOIP, and so forth, initiating a service session 124 may include establishing a connection using the appropriate (e.g., OSI layer 7 or application layer) protocol for IM, text messaging or chat, video teleconferencing, VOIP conferencing, and so forth. In some implementations, the point value of the service request 106 may be added (316) to one or more scores of the SR 118.

Figure 4:
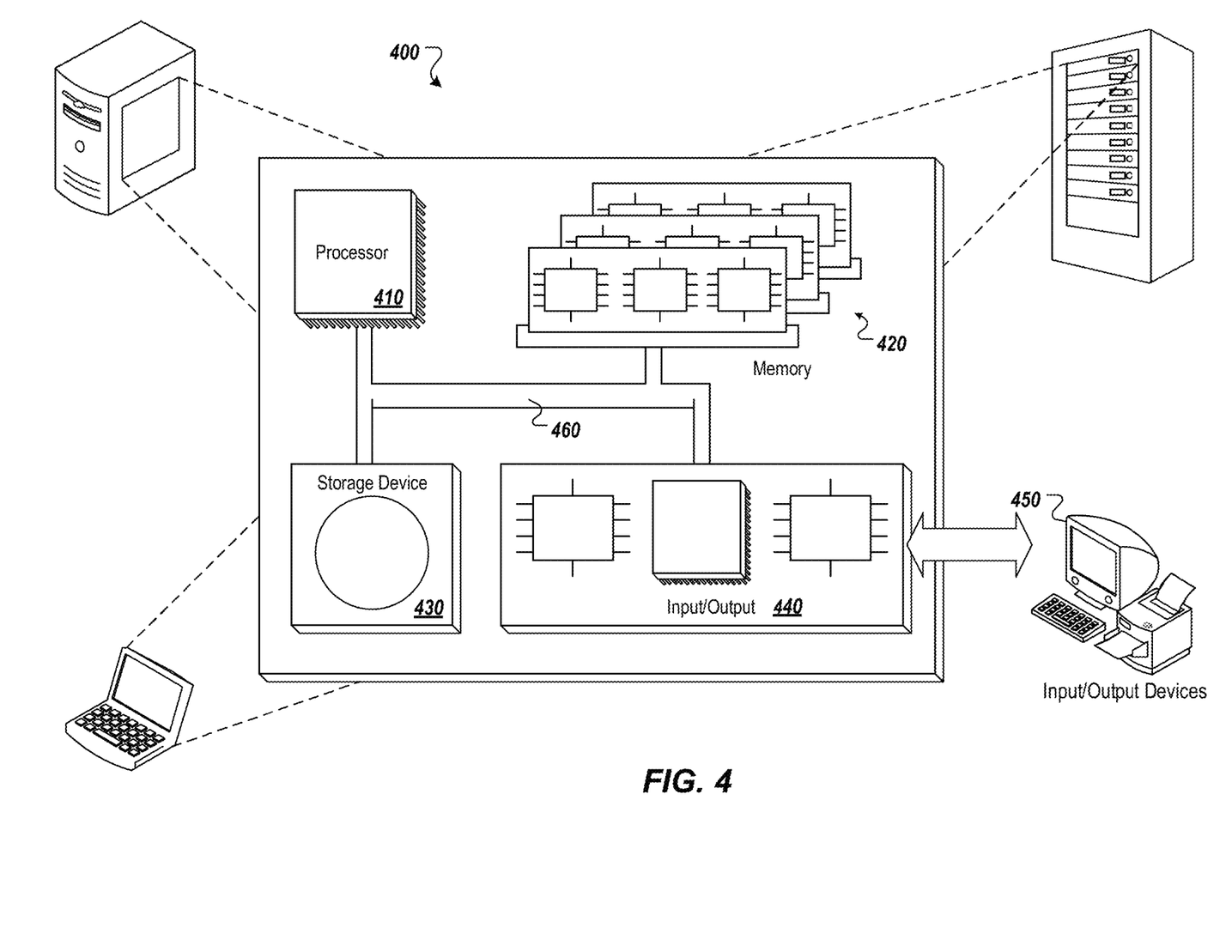
FIG. 4 depicts an example computing system, according to implementations of the present disclosure.

FIG. 4 depicts an example computing system, according to implementations of the present disclosure. The system 400 may be used for any of the operations described with respect to the various implementations discussed herein. For example, the system 400 may be included, at least in part, in one or more of the user device 104, the SR device 120, the service management device(s) 108, and/or other computing device(s) described herein. The system 400 may include one or more processors 410, a memory 420, one or more storage devices 430, and one or more input/output (I/O) devices 450 controllable through one or more I/O interfaces 440. The various components 410, 420, 430, 440, or 450 may be interconnected through at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks using any network protocol.

Computing devices of the system 400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for routing a service request, the method being performed by at least one processor, the method comprising:
   determining, by the at least one processor, for each of a plurality of service requests received in a service environment, a respective level of difficulty of the service request and a respective estimate of time needed to resolve the service request;
   determining, by the at least one processor, a numerical point value for each service request based on the respective level of difficulty of the service request and the respective estimate of time needed to resolve the service request, wherein the numerical point value increases faster than linearly as the respective estimated time needed to resolve the service request increases;
   reducing an amount of computational resources used in routing the plurality of service requests to one or more devices of one or more service representatives, relative to an amount of computational resources that would be used by one or more systems in routing the plurality of service requests without input of the one or more service representatives, wherein reducing the amount of computational resources comprises:
   transmitting, by the at least one processor, user interface data that, when received by a user device of a service representative (SR), causes the user device to render a user interface (ET) including one or more graphical representations representing:
      a list of the plurality of service requests, the list including, for each service request of the plurality of service requests, (i) the respective level of difficulty of the service request, (ii) the respective estimate of time needed to resolve the service request, and (iii) the respective numerical point value that was determined based on the respective level of difficulty of the service request and the respective estimate of time needed to resolve the service request; and
      one or more user-selectable icons that, when selected, indicate a selection of a particular service request from the list for initiation of a service session;
   detecting, by the at least one processor, a selection of the one or m ore user-selectable icons indicating selection of a particular service request from the list, the selection made through the UI by the SR; and
   in response to detecting the selection of the particular service request, initiating, by the at least one processor, a service session between the SR and an individual that initiated the particular service request, and adding the point value of the selected service request to a score for the SR, wherein initiating the service session includes establishing a real-time communications channel between a user device of the individual that initiated the particular service request and the user device of the SR.

2. The method of claim 1, wherein the list of the plurality of service requests further includes, for each service request of the plurality of service requests, one or more of:
   a communication channel of the service request;
   a category of the service request;
   a keyword associated with the service request;
   an identifier of the individual associated with the service request; or
   a presence of the individual in a favorites list of the SR.

3. The method of claim 1, wherein at least one of the difficulty of the service request or the respective estimate of time needed to resolve the service request is determined based at least partly on a natural language analysis of the service request.

4. The method of claim 1, wherein at least one of the difficulty of the service request or the respective estimate of time needed to resolve the service request is determined based at least partly on an indication made through a request interface by an individual associated with the service request.

5. The method of claim 1, wherein the numerical point value for each of the plurality of service requests is determined by applying a set of rules.

6. The method of claim 5, further comprising:
   presenting, by the at least one processor, the set of rules in the UI; and
   providing, by the at least one processor, at least one control in the UI, the at least one control being employable by an authorized user to modify the set of rules.

7. The method of claim 1, wherein the service session is initiated as one or more of a voice chat session, a video chat session, a text chat session, or a document sharing session.

8. The method of claim 1, wherein the list of the plurality of service requests that is presented in the UI is filtered based on one or more of a communication channel or a category associated with the SR.

9. The method of claim 1, wherein the list of the plurality of service requests is filtered based on a hierarchical set of filters.

10. A system, comprising:
    at least one processor; and
    a memory communicatively coupled to the at least one processor, the memory storing instructions which, when executed by the at least one processor, cause the at least one processor to perform operations comprising:
    determining for each of a plurality of service requests received in a service environment, a respective level of difficulty of the service request and a respective estimate of time needed to resolve the service request;
    determining a numerical point value for each service request based on the respective level of difficulty of the service request and the respective estimate of time needed to resolve the service request, wherein the numerical point value increases faster than linearly as the respective estimated time needed to resolve the service request increases;

reducing an amount of computational resources used in routing the plurality of service requests to one or more devices of one or more service representatives, relative to an amount of computational resources that would be used by one or more systems in routing the plurality of service requests without input of the one or more service representatives, wherein reducing the amount of computational resources comprises:

transmitting user interface data that, when received by a user device of a service representative (SR), causes the user device to render a user interface (UI) including one or more graphical representations representing:

a list of the plurality of service requests, the list including, for each service request of the plurality of service requests, (i) the respective level of difficulty of the service request, (ii) the respective estimate of time needed to resolve the service request, and (iii) the respective numerical point value that was determined based on the respective level of difficulty of the service request and the respective estimate of time needed to resolve the service request; and one or more user-selectable icons that, when selected, indicate a selection of a particular service request from the list for initiation of a service session;

detecting a selection of the one or more user-selectable icons indicating selection of a particular service request from the list, the selection made through the UI by the SR; and in response to detecting the selection of the particular service request, initiating a service session between the SR and an individual that initiated the particular service request, and adding the point value of the selected service request to a score for the SR, wherein initiating the service session includes establishing a real-time communications channel between a user device of the individual that initiated the particular service request and the user device of the SR.

11. The system of claim 10, wherein the numerical point value for each of the plurality of service requests is determined by applying a set of rules.

12. The system of claim 11, the operations further comprising:
presenting the set of rules in the UI; and
providing at least one control in the UI, the at least one control being employable by an authorized user to modify the set of rules.

13. One or more non-transitory computer-readable media storing instructions which, when executed by at least one processor, cause the at least one processor to perform operations comprising:

determining for each of a plurality of service requests received in a service environment, a respective level of difficulty of the service request and a respective estimate of time needed to resolve the service request;

determining a numerical point value for each service request based on the respective level of difficulty of the service request and the respective estimate of time needed to resolve the service request, wherein the numerical point value increases faster than linearly as the respective estimated time needed to resolve the service request increases;

reducing an amount of computational resources used in routing the plurality of service requests to one or more devices of one or more service representatives, relative to an amount of computational resources that would be used by one or more systems in routing the plurality of service requests without input of the one or more service representatives, wherein reducing the amount of computational resources comprises:

transmitting user interface data that, when received by a user device of a service representative (SR), causes the user device to render a user interface (UI) including one or more graphical representations representing:

a list of the plurality of service requests, the list including, for each service request of the plurality of service requests, (i) the respective level of difficulty of the service request, (ii) the respective estimate of time needed to resolve the service request, and (iii) the respective numerical point value that was determined based on the respective level of difficulty of the service request and the respective estimate of time needed to resolve the service request; and one or more user-selectable icons that, when selected, indicate a selection of a particular service request from the list for initiation of a service session;

detecting a selection of the one or more user-selectable icons indicating selection of a particular service request from the list, the selection made through the UI by the SR; and in response to detecting the selection of the particular service request, initiating a service session between the SR and an individual that initiated the particular service request, and adding the point value of the selected service request to a score for the SR, wherein initiating the service session includes establishing a real-time communications channel between a user device of the individual that initiated the particular service request and the user device of the SR.

14. The one or more non-transitory computer-readable media of claim 13, wherein the list of the plurality of service requests further includes, for each service request of the plurality of service requests, one or more of:
a communication channel of the service request;
a category of the service request;
a keyword associated with the service request;
an identifier of the individual associated with the service request; or
a presence of the individual in a favorites list of the SR.

15. The one or more non-transitory computer-readable media of claim 13, wherein at least one of the difficulty of the service request or the respective estimate of time needed to resolve the service request is determined based at least partly on a natural language analysis of the service request.

16. The one or more non-transitory computer-readable media of claim 13, wherein at least one of the difficulty of the service request or the respective estimate of time needed to resolve the service request is determined based at least partly on an indication made through a request interface by an individual associated with the service request.

* * * * *

UNITED STATES PATENT AND TRADEMARK OFFICE
CERTIFICATE OF CORRECTION

PATENT NO.         : 11,157,843 B1
APPLICATION NO.    : 15/169121
DATED              : October 26, 2021
INVENTOR(S)        : Michael Justin Cairns et al.

Page 1 of 1

It is certified that error appears in the above-identified patent and that said Letters Patent is hereby corrected as shown below:

In the Claims

Column 18, Line 2, Claim 1, delete "m ore" and insert -- more --, therefor.

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*